March 27, 1962 C. E. CAWKER ETAL 3,026,910
ORIFICE PLATE INSTALLATION
Filed July 28, 1958

INVENTORS
CHARLES E. CAWKER
ARTHUR GOULD
BY Whittemore, Hulbert
& Belknap
ATTORNEYS

United States Patent Office 3,026,910
Patented Mar. 27, 1962

3,026,910
ORIFICE PLATE INSTALLATION
Charles E. Cawker, Royal Oak, and Arthur Gould, Detroit, Mich., assignors to The Detroit Edison Company, Detroit, Mich., a corporation of New York
Filed July 28, 1958, Ser. No. 751,295
3 Claims. (Cl. 138—44)

The present invention relates generally to orifice plate installation, and refers more particularly to a construction for installing a flow measuring orifice in a welded piping system.

Industry has in the past been concerned with trying to find a simple and economical way to weld flow measuring orifices in piping systems. The installation of a flow measuring orifice in a system having gage pressures above one thousand pounds per square inch has been a particular problem in the past. A major difficulty in installing an orifice plate in a piping system has been in attempting to hold the plate stationary without gripping it in such a manner as to cause warping or dishing.

Therefore one of the essential objects of our invention is to provide a construction which will allow an orifice plate to be installed in a welded piping system without the orifice plate becoming warped or dished.

Another object is to provide a construction for installing an orifice plate which will allow the plate to be inspected periodically without damage to the orifice plate.

Another object is to provide a construction for installing an orifice plate which construction will not be a source of leaks when used in a high pressure piping system.

Another object is to provide a construction for installing an orifice plate in a piping system which construction will not have a critical clearance.

Another object is to provide a simple, economical and efficient construction for installing an orifice plate in a piping system.

Other objects, advantages and novel details of construction of this invention will be made more apparent as this description proceeds, especially when considered in connection with the accompanying drawings, illustrating a preferred embodiment of the invention, wherein.

The present invention consists of taking a pipe coupling which can be welded into a piping system and forming the abutting ends thereof in such a manner that an orifice plate is firmly gripped by the abutting ends so that after the abutting ends of the coupling have been welded together the orifice plate is not warped or dished and so that the weld on the abutting ends may later be removed to allow the inspection of the orifice plate without harming the orifice plate. According to the invention the proper gripping of the orifice plate is accomplished with the aid of a slot cut in the periphery of the orifice plate.

Figure 1:
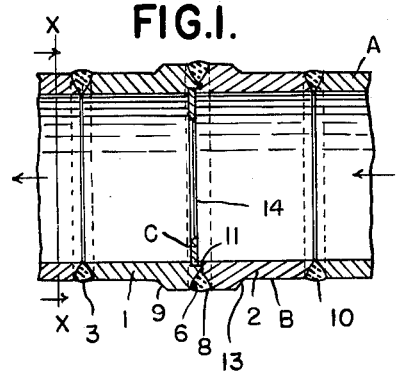
FIGURE 1 is a longitudinal section of a portion of a welded piping system, including a construction for installing a flow measuring orifice which embodies my invention.
Figure 2:
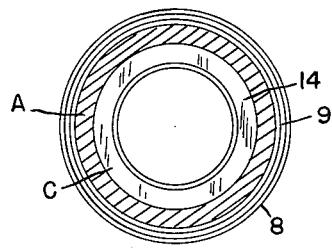
FIGURE 2 is a cross-section of the portion of the piping system shown in FIGURE 1 and is taken along the line X—X in FIGURE 1.
Figure 3:
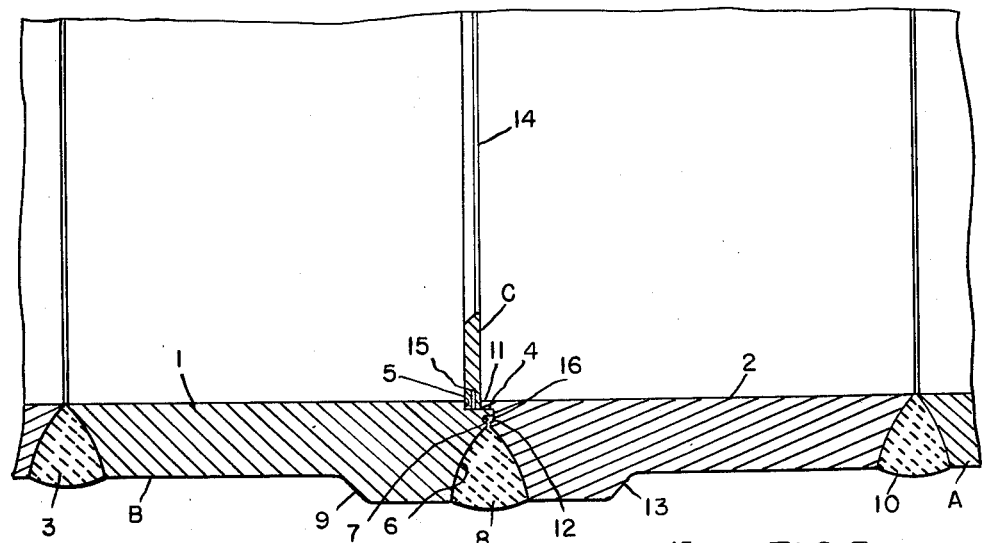
FIGURE 3 is an enlargement of a portion of the longitudinal section shown in FIGURE 1.
Figure 4:
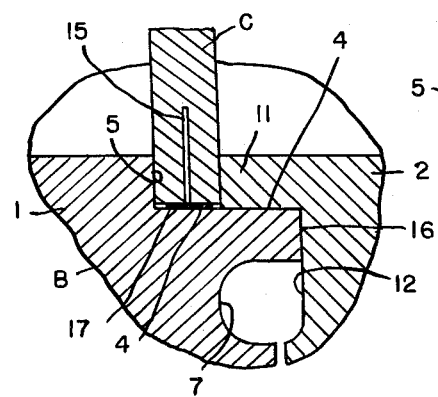
FIGURE 4 is an enlargement of a portion of the longitudinal section of FIGURE 3.

In FIGURE 3 a pipe coupling generally referred to by the letter B is shown welded into a piping system A and gripping an orifice plate C. The pipe coupling B consists of two abutting short pipe sections 1 and 2 which will be considered further in conjunction with FIGURES 3 and 4.

Section 1 of pipe coupling B has one end welded to the piping system A as shown at 3. The other or abutting end of section 1 is formed to facilitate the gripping of orifice plate C. The inside diameter of the abutting end of section 1 has been sharply increased, forming an annular recess 4 into which an orifice plate C can be placed. The recess 4 is formed with a shoulder 5 due to the abrupt change of the interior diameter of section 1. The orifice plate C rests firmly against the shoulder 5. The abutting end of section 1 is provided with a beveled edge 6 of such contour as to allow section 1 to be welded to the section 2. A second annular recess 7 has also been provided in the abutting end of section 1 which in conjunction with the abutting end of section 2 forms a small void directly under the weld 8 connecting the abutting ends of sections 1 and 2. This void facilitates the removal of the weld 8 without harming the orifice plate C. The abutting end of section 1 also has a built up outer diameter, indicated at 9, so that the strength of the coupling is as great at the abutting ends as it is elsewhere.

Section 2 of the pipe coupling B also has one end welded to the piping system A, as shown at 10. The other or abutting end of section 2 is formed so that it cooperates with the abutting end of section 1 to firmly grip the orifice plate C. The abutting end of section 2 is provided with an annular extension 11 which protrudes axially from section 2. The inside diameter of this extension is the same as that of section 2. The outside diameter of this extension is such that the extension will slip into the first annular recess in section 1. The length of the extension on the abutting end of section 2 is such that an orifice plate C is firmly gripped between the end of the extension 11 and the shoulder 5 of the recess 4. The abutting end of section 2 is also provided with an annular recess 12 which in conjunction with the second recess 7 in the abutting end of section 1 provides the aforementioned void beneath the weld 8. The abutting end of section 2 is also built up to provide strength, as indicated at 13, and beveled to facilitate placing the weld 8, as mentioned in connection with section 1 of coupling B.

The orifice plate C is a flat circular plate of metal or other suitable material having an orifice 14 therein through which a substance may flow. According to my invention the plate C is provided along its periphery with an annular, narrow, and relatively deep slot 15. The slot 15 provides a pair of axially spaced radially extending flanges at the edge of plate C. This slot allows spring action to take place in the orifice plate along its outer edge. With normal manufacturing tolerances in the depth of the recess 4 and the length of extension 11 the spring action in the orifice plate C due to the slot 15 allows the coupling B to be butted together at 16 with no clearance, thereby removing the human element in the setting of a clearance in the installation of orifice plates. Without the slot 15 in the periphery of the orifice plate C a clearance at 16 was found to be necessary. The clearance necessary at 16 was critical, the plate C warping or dishing after weld 8 was applied if the clearance was too small and the plate being loose if the clearance was too large. Due primarily to the spring action caused by the slot 15, the orifice plate C does not warp or dish when the sections 1 and 2 are butted tight at 16.

In use the orifice plate C is placed in the recess 4 of section 1 of the pipe coupling B and centered using any appropriate centering material 17, such as card-board spacers. The sections 1 and 2 of the coupling B are then butted together tight at 16 with the extension 11 of section 2 firmly pressing the periphery of the orifice plate C against the shoulder 5 of section 1. The sections 1 and 2 are then welded as shown at 8 to provide a leak-proof joint. The slot 15 in the periphery of the orifice plate C protects the plate from warping or becoming loose due to stresses caused by the connection between sections 1 and 2. The construction of the abutting ends of sections 1 and 2, as set out above, provides for the removal of the weld 8 so that the orifice plate C may be inspected without damage to the plate. The coupling B is then welded into a piping system A, as indicated at 3 and 10, completing the installation of the orifice plate C.

Figure 5:
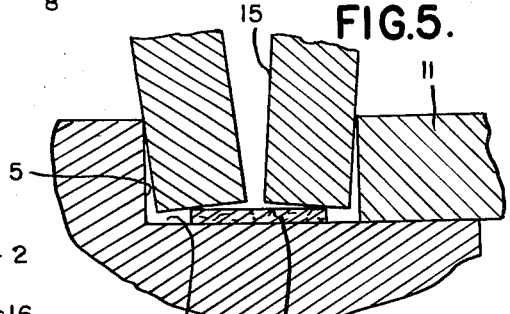
FIGURE 5 is also an enlargement of a portion of the longitudinal section of FIGURE 3.

FIGURE 5 is an exaggerated illustration of a portion of the edge of the orifice plate C showing the deformation which takes place in the periphery thereof when the ends of sections 1 and 2 of pipe coupling B are butted tight at 16. It will be appreciated that it is necessary to have pressure applied to the periphery of plate C during initial installation thereof so that the spring action within the plate due to annular slot 15 will be available to correct any looseness which may otherwise occur.

The drawings and the foregoing specification constitute a description of the improved orifice plate installation in such full, clear, concise and exact terms as to enable any person skilled in the art to practice the invention, the scope of which is indicated by the appended claims.

What we claim as our invention is:

1. A piping system, comprising an orifice plate between the ends of two weld coupled pipe sections, said pipe sections including end portions engaging and holding the periphery of the orifice plate in position therebetween, said orifice plate including an integral yieldable periphery operable to prevent the orifice plate from warping or becoming loose while being held by said pipe sections comprising a pair of axially spaced and yieldable radially extending annular flanges providing an annular groove therebetween of radial extent greater than the radial extent of said end portions of said pipe sections.

2. A piping system, comprising an orifice plate between the ends of two coupled pipe sections, said pipe sections including end portions engaging and holding the periphery of the orifice plate in position therebetween, said orifice plate including an integral yieldable periphery operable to prevent the orifice plate from warping or becoming loose while being held by said pipe sections comprising a pair of axially spaced and yieldable radially extending annular flanges providing an annular groove therebetween of radial extent greater than the radial extent of said end portions of said pipe sections.

3. A welded piping system, comprising an orifice plate between the ends of two pipe sections each having a mutually abutting end, a weld connecting said mutually abutting ends, a first of said pipe sections having an annular recess on the inside of said abutting end thereof, said recess having a shoulder at its inner end, an annular extension on the second abutting pipe end fitting within said annular recess, an orifice plate having a peripheral slot in the edge thereof, said orifice plate being fitted within the recess in the first abutting end and held therein by said extension on the second abutting end, the slot in said orifice plate being of greater radial dimension than the shoulder in said recess whereby said slot provides spring action within the plate to prevent the plate from warping and becoming loose with the pipe sections in assembly, and an annular recess in the abutting end of both pipe sections which together form a void at the inner surface of the aforesaid weld to allow uncoupling of the pipe sections and inspection of the orifice plate without destruction of the orifice plate, said orifice plate and the aforesaid weld joining the said pipe sections being offset longitudinally of said pipe sections.

References Cited in the file of this patent

UNITED STATES PATENTS

| | | |
|---|---|---|
| 375,054 | Dudley | Dec. 20, 1887 |
| 392,406 | Campbell | Nov. 6, 1888 |
| 797,027 | Tilden | Aug. 15, 1905 |
| 1,912,993 | Murray | June 6, 1933 |
| 2,520,089 | Lippincott | Aug. 22, 1950 |
| 2,550,844 | Meiller et al. | May 1, 1951 |
| 2,661,768 | Novak et al. | Dec. 8, 1953 |
| 2,732,229 | Gaum | Jan. 24, 1956 |